US008667879B2

(12) United States Patent
Kidd et al.

(10) Patent No.: US 8,667,879 B2
(45) Date of Patent: Mar. 11, 2014

(54) MULTILAYER BACKING MATERIALS FOR COMPOSITE ARMOR

(71) Applicants: Julie A. Kidd, North Ogden, UT (US); Michael E. Fuller, Ogden, UT (US)

(72) Inventors: Julie A. Kidd, North Ogden, UT (US); Michael E. Fuller, Ogden, UT (US)

(73) Assignee: Alliant Techsystems Inc., Minneapolis, MN (US)

( * ) Notice: Subject to any disclaimer, the term of this patent is extended or adjusted under 35 U.S.C. 154(b) by 0 days.

(21) Appl. No.: 13/937,374

(22) Filed: Jul. 9, 2013

(65) Prior Publication Data

US 2014/0000802 A1  Jan. 2, 2014

Related U.S. Application Data

(62) Division of application No. 12/879,496, filed on Sep. 10, 2010, now Pat. No. 8,505,432.

(51) Int. Cl.
 *F41H 5/04* (2006.01)
(52) U.S. Cl.
 USPC ............ 89/36.02; 89/908; 428/911; 109/49.5
(58) Field of Classification Search
 USPC .............. 89/36.01–36.09; 429/911; 109/49.5
 See application file for complete search history.

(56) References Cited

U.S. PATENT DOCUMENTS

| 5,340,633 | A  | * | 8/1994  | van der Loo et al. | 428/114 |
| 8,043,696 | B2 | * | 10/2011 | Chen et al. | 428/335 |
| 8,065,947 | B2 | * | 11/2011 | Park et al. | 89/36.02 |
| 8,505,432 | B2 | * | 8/2013  | Kidd et al. | 89/36.02 |
| 2010/0203304 | A1 | * | 8/2010 | Carbajal | 428/219 |
| 2011/0192274 | A1 | * | 8/2011 | Fingerhut | 89/36.02 |
| 2011/0256341 | A1 | * | 10/2011 | Geva et al. | 428/114 |
| 2011/0296979 | A1 | * | 12/2011 | Howland | 89/36.02 |
| 2012/0060676 | A1 | * | 3/2012 | Kidd et al. | 89/36.02 |
| 2012/0077005 | A1 | * | 3/2012 | Chen et al. | 428/216 |
| 2012/0088072 | A1 | * | 4/2012 | Pawloski et al. | 428/143 |
| 2012/0160086 | A1 | * | 6/2012 | Carbajal | 89/36.02 |
| 2012/0164370 | A1 | * | 6/2012 | Carbajal | 428/102 |

* cited by examiner

*Primary Examiner* — Michael David
(74) *Attorney, Agent, or Firm* — Fitch, Even, Tabin & Flannery LLP

(57) ABSTRACT

A multilayer backing composite for armor plate systems. One embodiment provides a ceramic layer and a bonded multilayer backing layer bonded to the ceramic layer. The backing layer can be formed from at least two layers each of alternating elastomeric interstitial layers and UHMWPE layers having an areal density in the range of about 125 to 400 g/m². The areal density of the stack can be in the range of about 4 to 15 lbs/ft², and specifically about 6.98 lbs/ft². In some embodiments, at least one of the at least two UHMWPE layers nearer to the ceramic layer of the stack can have a lower areal density than at least one layer further from the ceramic layer. The ceramic layer can be SiC and 0.280" thick; each rubber layer can be about 0.01"; and each UHMWPE layer can be about 0.15".

8 Claims, 4 Drawing Sheets

MULTILAYER BACKING MATERIALS FOR COMPOSITE ARMOR

CROSS-REFERENCE TO RELATED APPLICATIONS

This application is a Divisional patent application of U.S. application Ser. No. 12/879,496, filed Sep. 10, 2010, the entire disclosures of which application are hereby incorporated herein by reference.

FIELD

The present device and methods generally relate to composite armor systems, and specifically to multilayer backing materials for composite armor systems.

BACKGROUND

Body armor and armor plating are known in the art to protect against ballistic penetration. Armor plating can be made of various materials and compositions such as ceramics and composites. Each material has distinct advantages. For example, ceramic plating can provide an extremely hard surface, yet it can be heavy and brittle. Composites are a light weight alternative, but may not have the anti ballistic qualities of a ceramic plate.

For example, silicon carbide (SiC) can be bonded together using sintering to form a very hard ceramic plate. Also, ultra high molecular weight polyethylenes (UHMWPE) (also known as high-modulus polyethylene (HMPE) or high-performance polyethylene (HPPE)) are a type of thermoplastic polyethylene known in the art for antiballistic characteristics. One such UHMWPE, is sold under the trade name DYNEEMA by Royal DSM of the Netherlands, can be used in body armor or vehicle armor. Extremely long chains of polyethylene in an UHMWPE can effectively transfer load to a polymer backbone by strengthening intermolecular interactions thus providing excellent impact strength.

Attempts in the art have also included multilayered antiballistic structures, which can include a ceramic and composite (UHMWPE) layer (See generally, U.S. Pat. No. 5,340,633 to Van Der Loo et al.). The multilayered armor plate of Van Der Loo provides some weight and flex reduction, while maintaining effective antiballistic characteristics.

Despite these advances in the art, further improvements are possible and desired. For example, it is desirable to further reduce the weight of armor plating systems while maintaining effective antiballistic characteristics.

SUMMARY

Accordingly, there is provided herein embodiments of a multilayer backing composite for armor plate systems. One embodiment provides a bonded multilayer armor stack having a ceramic layer and a bonded multilayer backing layer bonded to the ceramic layer. The backing layer can be formed from at least two layers each of alternating elastomeric interstitial layers and UHMWPE layers having an areal density in the range of about 125 to 400 g/m². In one embodiment 4 layers of alternating rubber interstitial layers and UHMWPE layers is provided. The areal density of the stack can be in the range of about 4 to 15 lbs/ft², and specifically about 6.98 lbs/ft².

In some embodiments, at least one of the at least two UHMWPE layers nearer to the ceramic layer of the stack can have a lower areal density than at least one layer further from the ceramic layer. Also, the ceramic layer can be SiC and 0.280" thick; each rubber layer can be about 0.01"; and each UHMWPE layer can be about 0.15". Also, the elastomeric interstitial layer can be a silica filled nitrile butadiene rubber (SFNBR). The backing layer can be bonded to the ceramic layer by an epoxy paste adhesive.

Methods to make the embodiments can include the steps of providing a UHMWPE panel on a surface, such as a glass topped table; applying a MEK activated side of rubber panel on one side of the UHMWPE panel; removing a poly backing from a second exposed side of the rubber layer; MEK activating the second exposed side of the rubber layer; applying a second UHMWPE panel to the MEK activated second exposed side; curing the bonded panels to form a multilayer backing panel; bonding the backing panel to the ceramic layer.

Methods of curing the multilayer backing panel can include the steps of: pressurizing the backing panel in an autoclave from about the range of 60 to 200 PSI; ramping the backing panel temperature at about 1 to 10° F./minute to about the range of 200 to 270° F.; holding the backing panel temperature for about 30 to 300 minutes; releasing pressure; and cooling the backing panel to the range of about ambient to 200° F.

In some embodiments the process can also include the step of forming the backing layer using the step of vacuum bagging the backing layer on a caul plate. The step of bonding the backing layer to the ceramic layer to form the armor stack can include the steps of wiping a first side of the ceramic layer with a solvent; applying an epoxy paste adhesive to a first side of a backing layer; smoothing the adhesive with a flat serrated edged rubber blade; applying the first side of the ceramic layer with the first side of the backing layer; and curing the formed armor stack for at least about 6 hours at ambient temperatures. Additional steps can include the step of forming the armor stack into a predetermined shape by applying force to the armor stack against a forming tool during the steps of pressurizing and temperature ramping of the backing panel. In specific embodiments the step of pressurizing the backing panel in an autoclave can be about 100 PSI; the step of ramping the backing panel temperature can be at about 5° F./minute to about 240° F.); and the step of holding the backing panel temperature can be for about 120 minutes.

Other features will become more apparent to persons having ordinary skill in the art to which pertains from the following description and claims.

BRIEF DESCRIPTION OF THE FIGURES

The foregoing features, as well as other features, will become apparent with reference to the description and FIGURES below, in which like numerals represent elements, and in which.

DETAILED DESCRIPTION

The present device and methods generally relate to composite armor systems, and specifically to multilayer backing materials for composite armor systems. For example, armor plating can include large scale body armor, such as for military troops. Examples include vest and plate combinations. Initial vests were designed for fragmentation threats (artillery and/or grenade fragments) pistol rounds (up to 9 mm) and the plate (sometimes referred to as a small arms protective insert (SAPI), providing protection against common military rifle ball round threats. As the threat spectrum increased, so did the need to increase the antiballistic effect of body armor. For example, an enhanced small arms protective inserts (ESAPI), provided further protection against small arms armor piercing threats. The increased protection came at the expense of increased weight, by about 40 percent. The increased weight reduced mobility and range of the person or vehicle using the ESAPI standard.

The present methods and embodiments can provide an armor plating stack that has a significantly lighter weight from use of lower density elastomeric interstitial layers, while providing the protection of an ESAPI system. When used on vehicles such as tanks or helicopters, advantage of the present systems and methods can include longer vehicle range and reduced fuel consumption. When used as body armor, fatigue can be reduced and also result in a longer range for the user.

Figure 2:
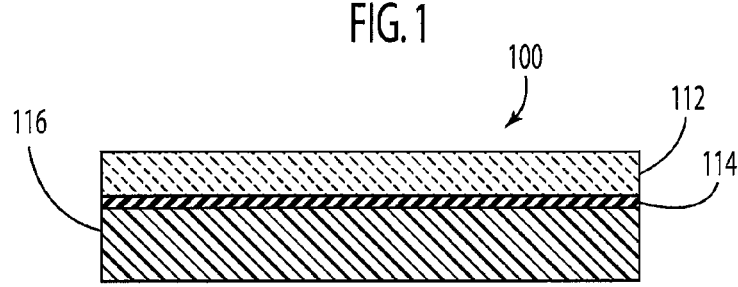
FIG. 2 is a is a cross-section of prior art armor composite.

Turning now to the Figures. FIG. 2 illustrates a prior art schematic of an armor stack generally indicated at 100. As shown in FIG. 2, the antiballistic structure can have a first ceramic layer 112, and a second layer of a high tensile strength composite material 116. An intermediate layer 114 can be provided, such as one having a flexural modulus which is higher than the flexural modulus of the composite material layer 116 and can be lower than the flexural modulus of the ceramic material layer 112. (See generally, Van Der Loo).

In mechanics, the flexural modulus can be the ratio of stress to strain in flexural deformation. In other words, the tendency of a material to bend. The modulus can be established from a slope of a stress-strain curve produced. It is an intensive property using units of force per area. In one formula, flexural modulus can be: $E(bend) = L3F/4wh3d$.

Figure 1:
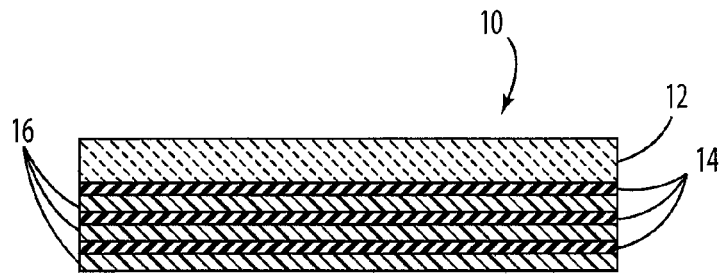
FIG. 1 is a cross-section of one embodiment of a present multilayer armor composite.

The present embodiments and methods provide effective antiballistic characteristics with less weight than known in the art. As shown in FIG. 1, a cross section for an armor stack generally indicated at 10 shows multilayer backing materials for a composite armor system. A first ceramic layer 12 compositions can be made from a silicon carbide (SiC). Ceramic layer compositions can also include boron carbide ($B_4C$), titanium diboride ($TiB_2$), aluminium oxide ($Al_2O_3$), other carbides, borides, oxides, and combinations thereof. The ceramic layer can be formed from hot pressing, sintering, and the like.

As shown, the backing layers of ceramic layer 12 can be composite layers such as an ultra high molecular weight polyethylene (UHMWPE) 16. Composite 16 can include ultra high molecular weight polyalkene filaments (such as polyethylene or polypropylene) having the tensile modulus of at least 40 GPa and the tensile strength of at least 1 GPa in a matrix which at least partially surrounds the polyalkene filaments. For example, composite fibers based on UHMWPE available under the brand names DYNEEMA® HB2 (having an areal density of about 250-270 g/m² and a ballistic rating having a V50 value of greater than or equal to about 765 m/sec) and DYNEEMA® HB50 (having an areal density of about 220-240 g/m² and a ballistic rating having a V50 value of greater than or equal to about 780 m/sec) can be used. It is noted that suitable areal densities would include those found in any flexible and/or semi-rigid backing system ranging from about 125 to about 400 g/m².

It is also noted that composite layer types can include a variety of high tensile strength textile composites and combinations, preferably of a unidirectional nature. For example, fiberglass, such as E-glass, S-glass, and the like, and various combinations thereof can be used. In embodiments using E-glass, alumino-borosilicate glass with less than 1 wt % alkali oxides can be used. S-glass embodiments can be an alumino silicate glass without CaO but with high MgO content.

As shown, composite layer 16 can be stacked alternating with an interstitial layer 14. Interstitial layers 14, as shown, can be an elastomeric material, such as a rubber including a nitrile butadiene rubber (NBR) or an ethylene propylene diene monomer (M-class) rubber (EPDM). In one embodiment the rubber can be a silica filled nitrile butadiene rubber (SFNBR). In some embodiments, the composite layer (e.g., SiC tile) can be coated in various elastomeric configurations (i.e., either or both sides and/or various tile edges). Preferably, the tile is rubber coated on one side and preferably not on the strike face, and all edges with a thickness in the range of about 0.010 to 0.020 inches (10 to 20 mils). This configuration actually improves performance against ballistic impact. It is noted that performance degrades in embodiments where the tile is encapsulated in rubber or where the strike face tile side is rubber coated.

An advantageous rubber composition and methods for its manufacture, that can be used in fabricating the present multilayer backing material and the composite armor is described in the Application of Gajiwala et al, U.S. application Ser. No. 12/879,827, filed on even date herewith, the complete disclosure of which is incorporated by reference. The described rubber compositions with nanoclay filler instead of silica, and cured with a sulfur-containing curative can be used in making our multilayer backing material and the armor.

As such the present armor stack 10, has less weight than the prior art armor stack 100. For example, as described, the areal density of the stack can be in the range of about 4 to about 15 lbs/ft², and more particularly in a range of about 4 to about 8 lbs/ft². Surprisingly, the armor stack 10, despite its lighter weight and less use of UHMWPE, exhibits comparable antiballistic characteristics than armor stack 100.

These comparable findings can be established using ballistic testing of subscale test articles manufactured using 4"×4" silicon carbide (SiC) tiles mounted adhesively to a 12"×12" backing plate. The SiC tile thickness can be fixed at 0.280" for the test series and the backing material and construction varied to determine the effects of the backing system on the overall performance of the stack.

A number of exemplary backing material constructions can be produced for these test series such as those shown in Table 1. The number in parentheses indicate the number of layers used for the example. It is noted that embodiments can include at least two layers each of alternating elastomeric interstitial layers and UHMWPE layers, preferably 3 to 5 layers each, and most preferably 3 to 4 layers each.

TABLE 1

Material configuration and corresponding areal density

| Material Stack | Calculated Areal Density (lbs/ft²) |
|---|---|
| 0.280" SiC/0.01" Rubber/0.50" UHMWPE | 7.13 |
| 0.280" SiC/0.02" Rubber/0.50" UHMWPE | 7.18 |
| 0.280" SiC/0.01" Rubber (3)/0.15" UHMWPE (3) | 6.98 |
| 0.280" SiC/0.02" Rubber (3)/0.15" UHMWPE (3) | 7.16 |
| 0.280" SiC/0.01" Rubber (4)/0.11" UHMWPE (4) | 6.99 |
| 0.280" SiC/0.02" Rubber (4)/0.11" UHMWPE (4) | 7.20 |

For exemplary tests, sample UHMWPE panels 16 were obtained in a variety of thicknesses (0.11", 0.15" and 0.50"). It is noted that some embodiments of the products herein can vary in thickness and/or areal density among the UHMWPE layers within stack 10. Some testing suggests that performance can be maintained by decreasing areal density the closer the layer is to the strike plate. In this instance, and for illustrative purposes only, the UHMWPE panel was made from DYNEMA HB-2® in each layer. These panels were prepared by wiping them with isopropyl alcohol to remove any residual oils and contaminants that may have remained on the panels during manufacture or accumulated during shipping. Interstitial layers 14 (here shown as rubber sheets) were calendared from base material to 0.010" thickness, laminated on poly backing and rolled. To use a 0.020" thick rubber, two sheets of 0.010" thick rubber were laminated together using a solvent such as an MEK (methyl ethyl ketone) spray to activate the rubber surfaces. In some instances the rubber/elastomer was used with silica filler and cured, in other instances the rubber was used with nanoclay filler and cured with sulfur-curative. A slight performance advantage can be found with nanoclay filled rubber. In all cases, the elastomer was laid up in the uncured ("green") form and cured in an autoclave.

Armor stack fabrication occurred by a layered build up of the materials in sequence as shown in FIG. 1 and FIG. 2. It is noted that several possible embodiments can be realized using the present methods and systems. The following is for illustrative purposes only.

All ceramic layer 12 (SiC) tiles can have a rubber interstitial layer bonded to one ceramic tile face. This can be accomplished by cutting a rubber sheet to a 4.5" square. This sheet can then be activated by spraying a solvent, such as MEK, on one surface. This surface can then be pressed to the SiC tile such that the SiC tile is centered on the rubber sheet. The remaining rubber extending beyond the SiC tile edge can then be folded up over the edges of the SiC tile. The remaining corners can next be pressed flat against the edges of the SiC tile. Bonding can be completed by vacuum bagging the tile and subjecting the vacuum bagged assembly to a pressure cure in an autoclave. An exemplary pressure cure can be as follows:

Pressurize the autoclave from about 60 PSI to about 200 PSI and preferably about 100 PSI.
Next, ramp temperature at about 5° F./minute to between about 200° F. to 320° F., and preferably to about 240° F.,
Next, hold temperature for between about 30 minutes to about 300 minutes, and preferably about 120 minutes,
Next, furnace cool to room temperature and release pressure below about 180° F. to ambient temperature.

It is noted that 'ambient' temperature as used herein refers to 'room' temperature typically in the range of about 50 to 100° F., and preferably about 70° F.

Following an autoclave cure, the ceramic tiles (SiC) can be removed from the vacuum bagging and prepared for bonding to the ultra high molecular weight polyolefin (UHMWPO) backing, e.g., UHMWPE backing. For testing purposes prior art backing samples (such as shown in FIG. 2) can be produced to compare with the present backing embodiments (FIG. 1). The prior art backing samples can be produced by laying a 0.5" thick UHMWPE panel on a surface, such as a glass topped table, and marking the area of the SiC tile in the center of the UHMWPE panel. A small amount of adhesive was placed in the approximate center of the UHMWPE panel then screed using, for example a flat serrated edged blade (such as a rubber or plastic blade), to ensure a uniform coating of adhesive over an area slightly larger than the marked tile area.

Coating the tile in rubber can be performed in the same manner as the rubber layer layup for the backing. As indicated above, it is preferred to cover only the rear and sides of the tile (i.e., not the strike face). For the present sample embodiments, the rubber-coated SiC tile was then placed in the center of the adhesive area, rubber side down and pressed firmly into place. The panel assemblies were then vacuum bagged and allowed to cure in ambient conditions overnight. Following the overnight cure, the panels were debagged, any flashing was trimmed, and the panels labeled for testing.

The layered backing samples illustrating the present embodiments can be produced by laying a 0.11" or 0.15" UHMWPE panel on a surface, such as a glass topped table. A sheet of either 0.01" or 0.02" rubber can be MEK activated on one side then placed on the top surface of the UHMWPE panel. A poly backing, if present, can then be removed from the rubber sheet. This exposed surface can then be MEK activated and a second UHMWPE panel of the same or substantially the same thickness as the first can be placed on the rubber surface, such that the outer surfaces of the UHMWPE panels are aligned. It is noted that variations of UHMWPE thickness are possible and still be within the scope of the present embodiments. This layer process can be repeated until the panels have either three layers of 0.15" UHMWPE or four layers of 0.11" UHMWPE separated by rubber layers. These panels can then be vacuum bagged on a caul plate and autoclave cured.

The autoclave cure can occur by a process as follows. First, the autoclave can be pressurized to the range of about 60 to about 200 PSI and preferably about 100 PSI. Next, the temperature can be ramped at about 1 to about 10° F./minute and preferably to about 5° F./minute to about the range of about 200 to about 270° F. and preferably about 240° F. Next, temperature can be held for about 30 to about 300 minutes and preferably about 120 minutes. Next, the furnace can be cooled to ambient temperature and the pressure released below in the range of ambient to about 200° F. and preferable about 180° F.

Following the autoclave cure, the panels can be removed from the vacuum bag. The cured panels can next be laid on a surface, such as a glass topped table, where the top surface can be wiped with isopropyl alcohol to remove any contaminants. The UHMWPE panel can then be marked in the center of the panel with an outline of the area of the SiC tile. A portion of an epoxy paste adhesive (such as one sold under the trade name HYSOL EA9392 by Henkel Corporation of Bay Point, Calif.) can be placed in the approximate center of the UHMWPE panel then spread using a flat serrated edged rubber blade to ensure a uniform coating of adhesive over an area slightly larger than the marked tile area. The rubber-coated SiC tile can then be placed in the center of the adhesive area, rubber side down and pressed firmly into place. The panel assemblies can then be vacuum bagged and allowed to cure in ambient conditions for at least 6 hours and preferably at least 12 hours. Following the overnight cure, the panels can be debagged and any flashing trimmed.

Optionally, stack 10 curing can be combined with hard tooling to add or subtract a curvature or other desired shape to the plate and/or stack to provide a desired part geometry for custom applications. These various shapes can be formed during the autoclave curing described herein. For example, stack 10 can be formed to various shapes by laying up flat or slightly curved UHMWPE plates and vacuum bagging the formed plates to a 'hard tool' (forming tool) and using the heat and pressure of the autoclave to shape the stack against the forming tool.

Figure 3:
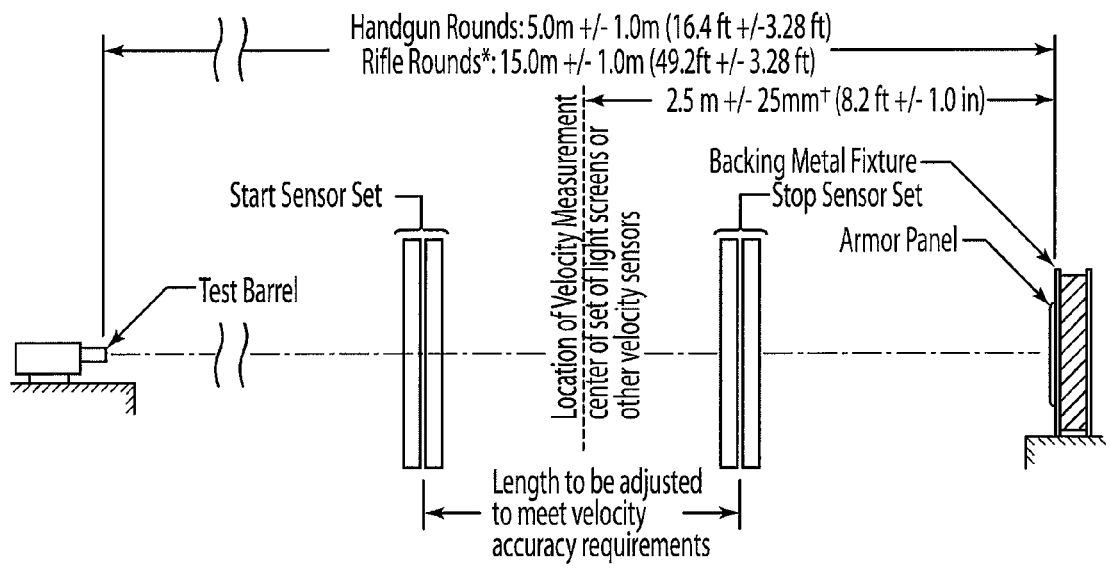
FIG. 3 illustrates a ballistic test range schematic.

As described below, the present embodiments exhibited comparable, and in some cases improved, antiballistic characteristics over the heavier prior art samples. Ballistic testing was done in accordance with the U.S. Department of Defense Ballistic Test Method MIL-STD 662F. A schematic of the test range is shown in FIG. 3 and was adapted to the National Institute of Justice Ballistic Resistance of Body Armor Standard 0101.06.

Velocity calibration and yaw verification was done prior to testing by firing several projectiles through break screens and infrared screens to verify accuracy of the infrared screens. Yaw cards were used at the impact point during the velocity calibration to verify that the projectiles had a yaw of less than three degrees at the impact point. Counter chronographs (such as one sold under the tradename HP model no. 53131A by Hewlett-Packard) were used in this test series. Additionally, high speed video operating at 10,000 frames per second was taken of each impact event to record the back face (i.e., the exposed back layer of the UHMWPE backing) behavior of the armor samples during the impact event. The projective ('threat round') used for ballistic testing of these armor samples was a 7.62×51 mm, 160 grain, M993 armor piercing (AP) surrogate round (such as one supplied by New Lenox Ordnance of Dwight, Ill.) to simulate an aggressive 7.62 mm caliber armor piercing round. For example, the AP round M993 used was a WC-cored steel jacketed 128 grain 7.62 mm bullet that has been type certified for use in the M60 and M240 Medium Machine Guns and in the M24 Sniper Weapon System. The M993 has a nominal muzzle velocity of 2985±32 ft/sec and a nominal penetrative capability of 0.275" of Rolled Homogenous Armor (RHA, MIL-A-46100) at 547 yards. Gun powder, such as one sold under the trade name VIHTAVUORI N140, was used in all tests. All projectiles were loaded into 7.62×63 mm cartridges just prior to testing and propellant loads were varied to maintain test velocities at 3200±50 fps. All test fires were done at a range of 25 feet and were completed using a universal receiver mounted with a 0.308" (7.62 mm) caliber barrel and mounted on a custom Chesapeake Testing mount. The tested armor stacks were mounted on a picture frame mount with two degrees of freedom to allow movement of sample to correspond to the fixed aim point of the test barrel configuration.

Test results of 151 tests using the methods described above are shown in Table 2. In Table 2, the first two lines of data show two variations of prior art armor stacks with backing. Lines 3 through 6 show variations of a multi-layered backing according to the present embodiments showing 3 and 4 layers alternating rubber and UHMWPE.

TABLE 2

Summary of ballistic testing data

| Material Stack | No. of Tests | No. Pass | No. Fail |
|---|---|---|---|
| 0.280" SiC/0.01" Rubber/0.50" UHMWPE | 19 | 14 | 5 |
| 0.280" SiC/0.02" Rubber/0.50" UHMWPE | 24 | 12 | 12 |
| 0.280" SiC/0.01" Rubber (3)/0.15" UHMWPE (3) | 18 | 14 | 4 |
| 0.280" SiC/0.02" Rubber (3)/0.15" UHMWPE (3) | 27 | 13 | 14 |
| 0.280" SiC/0.01" Rubber (4)/0.11" UHMWPE (4) | 31 | 17 | 14 |
| 0.280" SiC/0.02" Rubber (4)/0.11" UHMWPE (4) | 12 | 2 | 10 |

From the data shown above, it is apparent that the 0.280" SiC/0.01" Rubber (3)/0.15" UHMWPE (3) configuration shows equivalent ballistic performance to the 0.280"/0.01" Rubber/0.50" UHMWPE at a 2.1% decrease in areal density (see Table 1). Additionally, both 0.280" SiC/0.01" Rubber (3)/0.15" UHMWPE (3) and 0.280" SiC/0.01" Rubber (4)/ 0.11" UHMWPE (4) show equivalent or superior ballistic performance to the 0.280" SiC/0.02" Rubber/0.50" UHMWPE configuration while providing a 2.8% and 2.6% reduction in areal density, respectively. While the reduction in areal density may not appear significant, current body armor design practice would suggest that any disruption of the monolithic UHMWPE backing would result in reduced ballistic performance.

Figure 4A:
FIG. 4 illustrates a comparison high speed video image of backing samples of a multi-layer composite of the present embodiments (4A) and a single layer prior art backing (4B) approximately 200 μsec after ballistic impact.
Figure 4B:
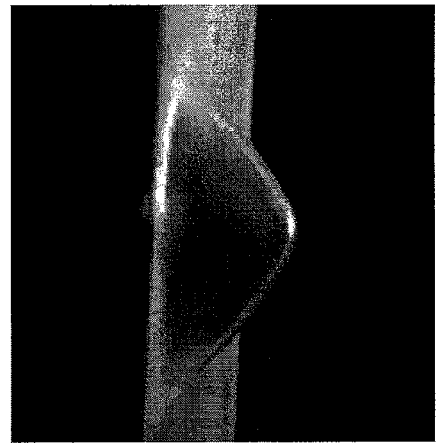

In addition to the baseline ballistic performance, the back-face deformation of the ballistic stack showed a marked difference in behavior from the multi-layered backing according to the present embodiments (4a) versus the prior art backing (4b). FIG. 4 shows high speed video images approximately 200 μsec after impact. Note the broader base of the deformation in the layered backing (4a) versus the prior art monolithic backing (4b). This suggests a more efficient transfer of energy to backing construct.

Figure 5A:
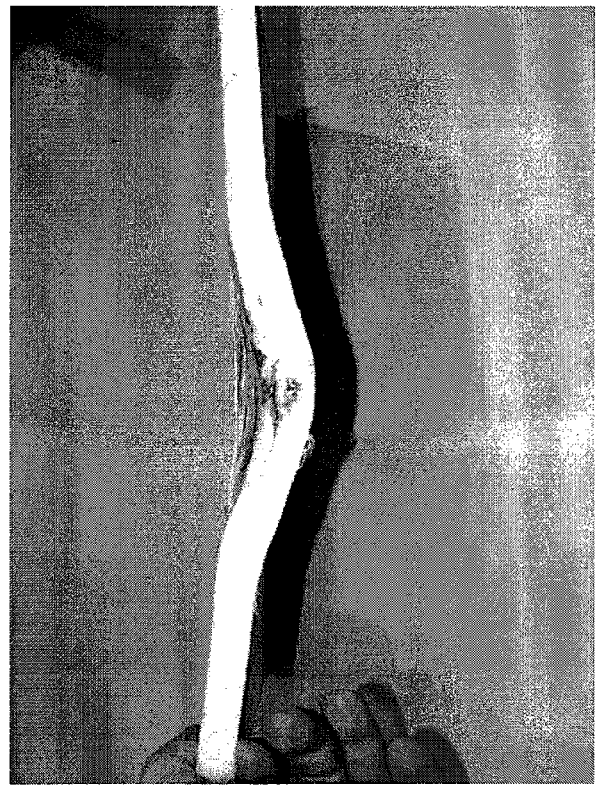
FIG. 5 illustrates a comparison of cross sections of backing samples of a multi-layer composite of the present embodiments (5A) and a single layer prior art backing (5B) after ballistic impact.
Figure 5B:
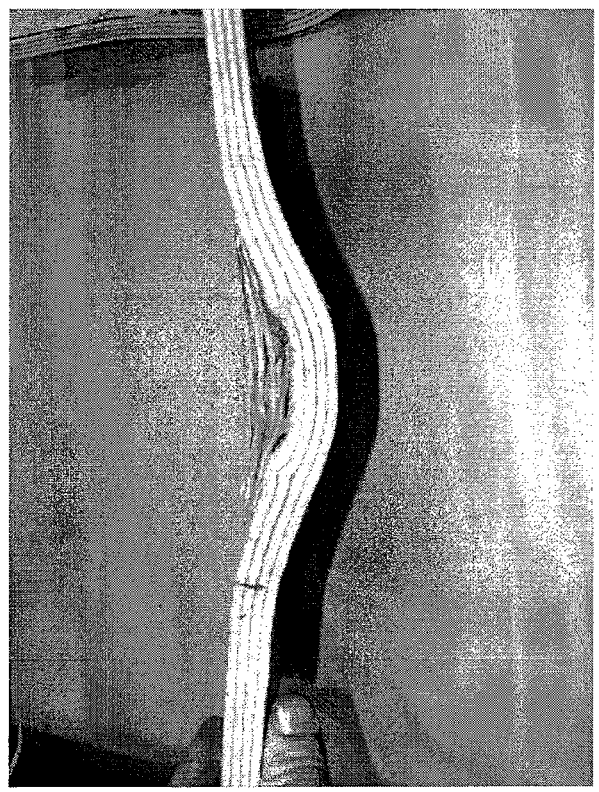
Figure 6:
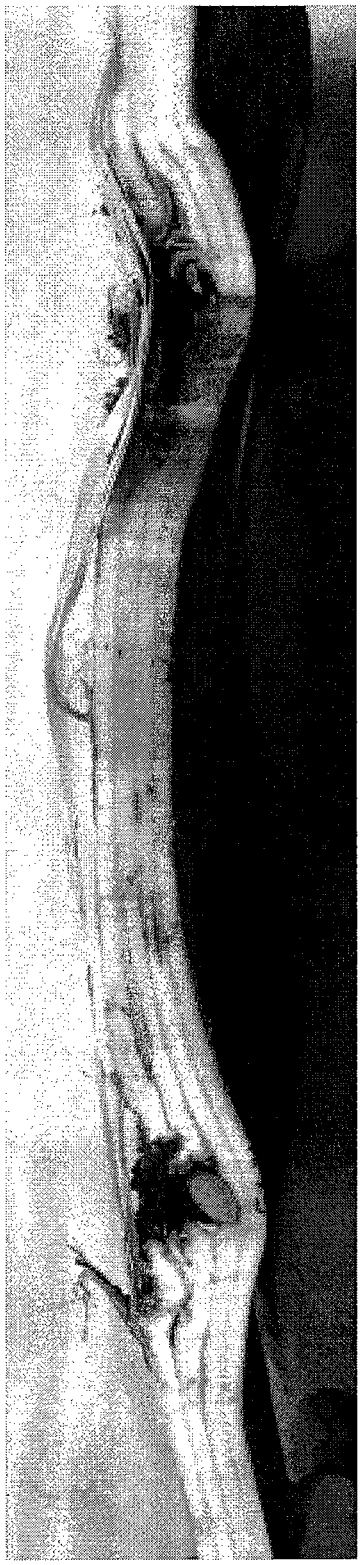
FIG. 6 illustrates a cross section of a backing sample of a multi-layer composite of the present embodiments after multiple ballistic impacts.

Similarly, FIG. 5 illustrates a comparison of cross sections of backing samples of a multi-layer composite of the present embodiments (5A) and a single layer prior art backing (5B) after comparable ballistic impacts. As shown, even though the layered stack is lighter in weight, there less fiber damage to the UHMWPE backing, especially to layers further from the strike plate. This is also shown in FIG. 6, which also illustrates a cross section of a backing sample of a multi-layer composite of the present embodiments after multiple ballistic impacts (See also the embedded ballistic object on the impact to the left). FIG. 6 shows not only no breach to the baking layer, but that the UHMWPE backing layer furthest from the strike plate had no fiber damage. FIG. 6 also shows decoupling of some of the layers after impact. This decoupling absorbs some of the ballistic impact so that impact is reduced with each successive layer.

Specifically, the images suggest that the layered backing of the present embodiments involves a broader area of the backing material in the impact event leading to an increase in efficiency of energy dissipation, which results in an increase in ballistic efficiency. Scaling this technology to full scale ballistic plates would result in reduced back-face deformation after impact which would decrease blunt force trauma inflicted on a soldier. The additional benefit of reduced armor stack weight, as discussed above, would provide an increase in user range. In other words, with a lighter overall weight, a user's fatigue would be reduced, thus allowing them to travel further or stand longer that would normally be found with use of a prior art ESAPI type antiballistic configuration.

While the embodiments and methods have been described in conjunction with specific embodiments, it is evident that many alternatives, modifications, and variations will be apparent to those skilled in the art in light of the foregoing description.

We claim:

1. A method of bonding an armor stack comprising the steps of: providing a UHMWPE panel on a surface; applying a MEK activated side of rubber panel on one side of the UHMWPE panel; removing a poly backing from a second exposed side of the rubber layer; MEK activating the second exposed side of the rubber layer; applying a second UHMWPE panel to the MEK activated second exposed side; curing the bonded panels to form a multilayer backing panel; and bonding the backing panel to a ceramic layer.

2. The method of claim 1, wherein the method of curing the multilayer backing panel comprises the steps of: pressurizing the backing panel in an autoclave from about the range of 60 to 200 PSI; ramping the backing panel temperature at about 1 to 10° F./minute to about the range of 200 to 270° F.; holding the backing panel temperature for about 30 to 300 minutes; releasing pressure; and cooling the backing panel to the range of about ambient to 200° F.

3. The process of claim 2, further comprising the step of forming the armor stack into a predetermined shape by applying force to the armor stack against a forming tool during the steps of pressurizing and temperature ramping of the backing panel.

4. The process of claim 2, wherein the step of pressurizing the backing panel in an autoclave is about 100 PSI.

5. The process of claim 2, wherein the step of ramping the backing panel temperature is at about 5° F./minute to about 240° F.

6. The process of claim 2, wherein the step of holding the backing panel temperature is for about 120 minutes.

7. The method of claim 1, wherein the process of forming the backing layer further comprises the step of vacuum bagging the backing layer on a caul plate.

8. The method of claim 1, wherein the step of bonding the backing layer to the ceramic layer to form the armor stack comprises the steps of: wiping a first side of the ceramic layer with a solvent; applying an epoxy paste adhesive to a first side of a backing layer; smoothing the adhesive with a flat serrated edged rubber blade; applying the first side of the ceramic layer with the first side of the backing layer; and curing the formed armor stack for at least about 6 hours at ambient temperatures.

* * * * *